INVENTORS
ROBERT L. PRICKETT
THEODORE P. JANUS
WILLIAM A. WOLK
BY
ATTORNEYS

Fig-4

Oct. 31, 1967  R. L. PRICKETT ET AL  3,350,560
X-RAY CRYSTALLOGRAPHY CAMERA HAVING PLURAL NESTED ROTATABLE
ECCENTRIC SLEEVES IN ONE WALL THROUGH WHICH A
TILTABLE SPECIMEN HOLDER EXTENDS

Filed Feb. 24, 1965

INVENTORS
ROBERT L. PRICKETT
THEODORE P. JANUS
WILLIAM A. WOLK

BY Harry A. Herbert Jr.
Louis E. Wey
ATTORNEYS

United States Patent Office 3,350,560
Patented Oct. 31, 1967

3,350,560
X-RAY CRYSTALLOGRAPHY CAMERA HAVING PLURAL NESTED ROTATABLE ECCENTRIC SLEEVES IN ONE WALL THROUGH WHICH A TILTABLE SPECIMEN HOLDER EXTENDS
Robert L. Prickett, Dayton, Ohio, Theodore P. Janus, Montvale, N.J., and William A. Wolk, Yonkers, N.Y., assignors to the United States of America as represented by the Secretary of the Air Force
Filed Feb. 24, 1965, Ser. No. 435,099
10 Claims. (Cl. 250—51.5)

ABSTRACT OF THE DISCLOSURE

A high temperature X-ray crystallography camera having a body containing a circular cavity open at the top and supporting three nested rotatable eccentric sleeves the innermost of which has a ball socket tiltably supporting an axially movable specimen holding tube extending into a target zone within the cavity of the body surrounded by a heater element and in the X-ray path passing through the camera and impinging on a firm strip, the body of camera having a vacuum connection and motor means for rotating the eccentric sleeves.

---

The invention described herein may be manufactured and used by or for the Government of the United States of America for governmental purposes without the payment of any royalties thereon or therefor.

This invention relates to photographic apparatus and, more particularly, to such apparatus as used in the field of crystallography. Still more specifically, one embodiment of this invention relates to high temperature photographic apparatus used in the field of crystallography.

In all fields of science, as man probes deeper and deeper into the secrets of nature, he requires increasingly complex apparatus. The need for ever increasing knowledge has been greatly accelerated by the advent of the space age. The space age has introduced man to an environment to which he is foreign, but to which he must learn to adapt himself with materials within his possession. One of the immediate problems at hand is to learn more of the natural characteristics of materials at the elevated temperatures encountered on space missions.

The camera apparatus to be disclosed, in addition to its camera uses, may also be used as a high temperature diffractometer.

When used as a camera, the test specimens to be studied usually comprise block specimens, pelleted powders, single crystals, or wires. The particular specimen to be studied is oriented at the focal point within the camera at which the heat and incoming X-rays are concentrated. The incoming X-rays impinge on the specimen which diffracts them onto the film contained within the camera. The particular diffraction pattern is determined by the atomic structure characteristic of the material. The exposed film, after development, can be used for a multitude of purposes including a showing of the atomic and molecular structure of the material, its identification and orientation, residual stress, impurities, solid solutions, phases, lattice parameters, defect structures and recrystallization. The procedures of these are all well known to the art and will not be further described.

When used as a diffractometer, the camera apparatus (less film and cassette) is centrally mounted on a horizontal goniometer for rotation and for angular measurement. A suitable X-ray photon detector, such as is well known to the art, is oriented in proper relationship to the camera apparatus and rotates on the goniometer in predetermined angular relationship with the camera apparatus. Prior high temperature diffractometers were adaptable primarily to the study of powder and sheet specimens at modest temperatures. The particular advantages of the present apparatus when used as a diffractometer include one or more of the following: operation at more elevated temperature, the capacity to measure both zero and first order layer lines in a diffraction pattern, and the ability to orient and position the test specimen in three dimensions without interfering with the capacity to rotate the test specimen.

One important object of this invention is to provide a high temperature crystallography camera operable at higher operating temperatures than prior cameras.

Another important object of this invention is to provide a crystallography camera in which the test specimen within the closed camera may be oriented and positioned in three dimensions without interfering with the capacity to rotate the test specimen.

A further object of this invention is to provide a high temperature crystallography camera in which the heated test specimen is in a below-atmospheric pressure environment.

Another object of this invention is to provide a high temperature crystallography camera in which a test specimen is heated by radiation heating instead of conduction heating, in order to maintain specimen alignment and to prevent specimen contamination by the conduction heating element.

Yet an other object of this invention is to provide a crystallography camera in which both zero and first order layer lines are simultaneously detectable.

Additional objects, advantages and features of the invention reside in the construction, arrangement and combination of parts involved in the embodiment of the invention as will appear from the following description and acompanying drawings, wherein:

Figure 1:
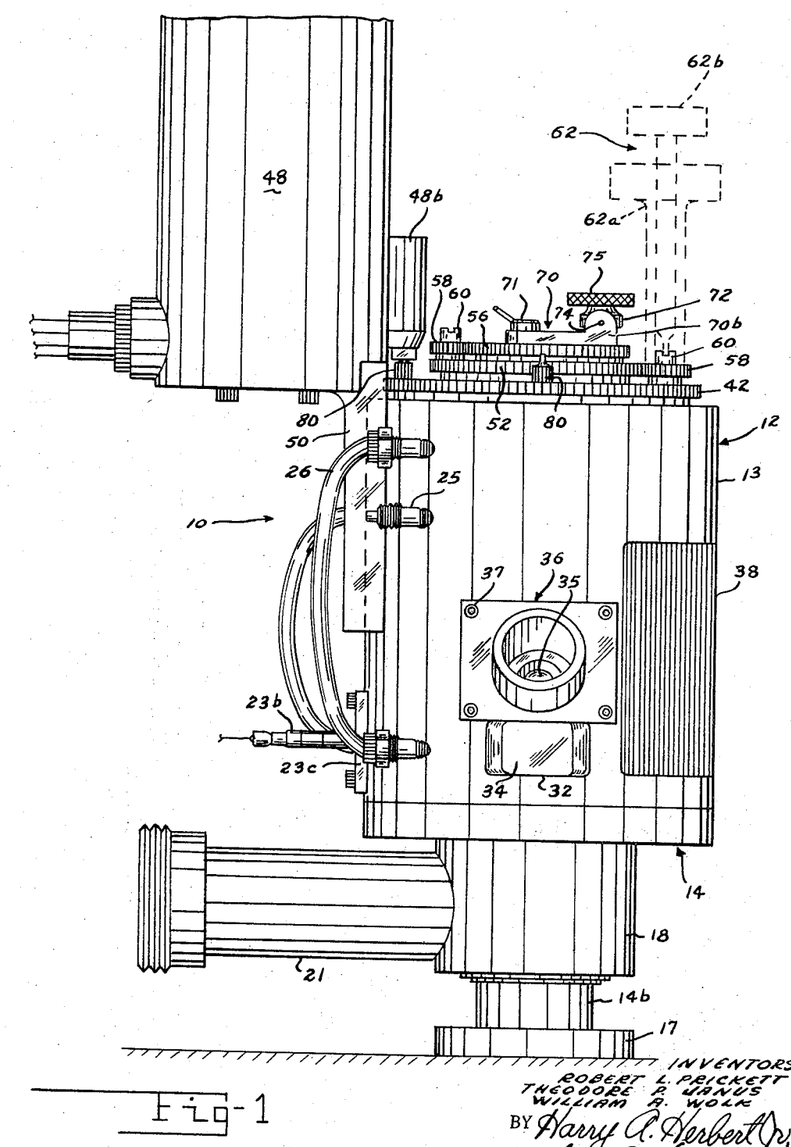
FIG. 1 is a first elevation view of the camera with the film cassette in place.
Figure 2:
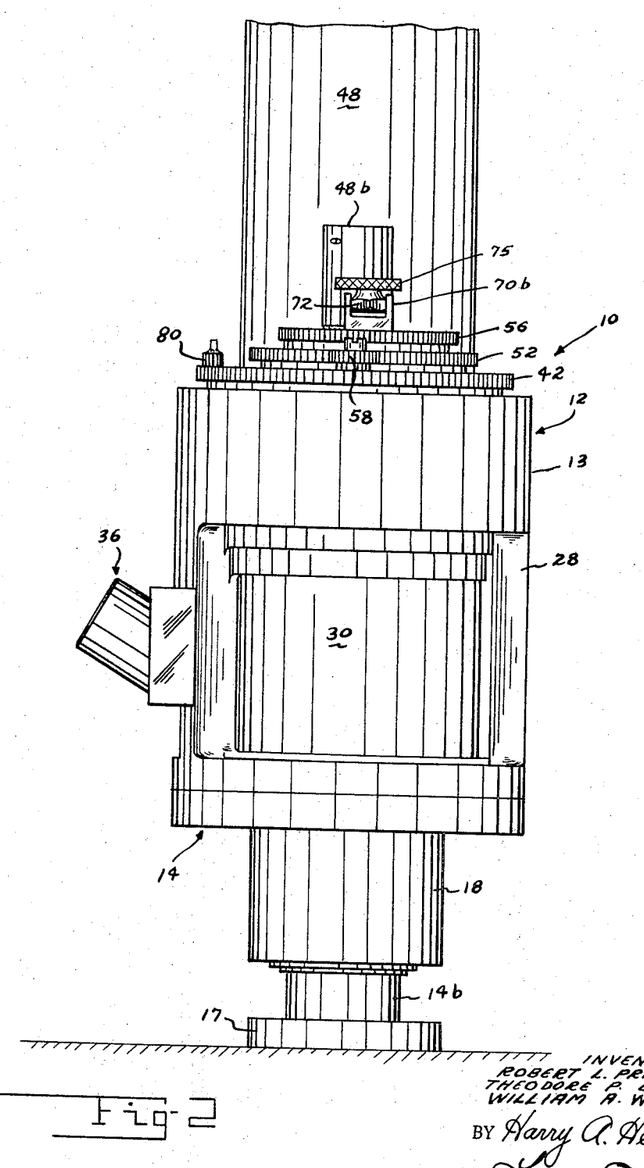
FIG. 2 is a second elevation view of the camera with the film cassette removed and rotated 90° to the left from FIG. 1.
Figure 4:
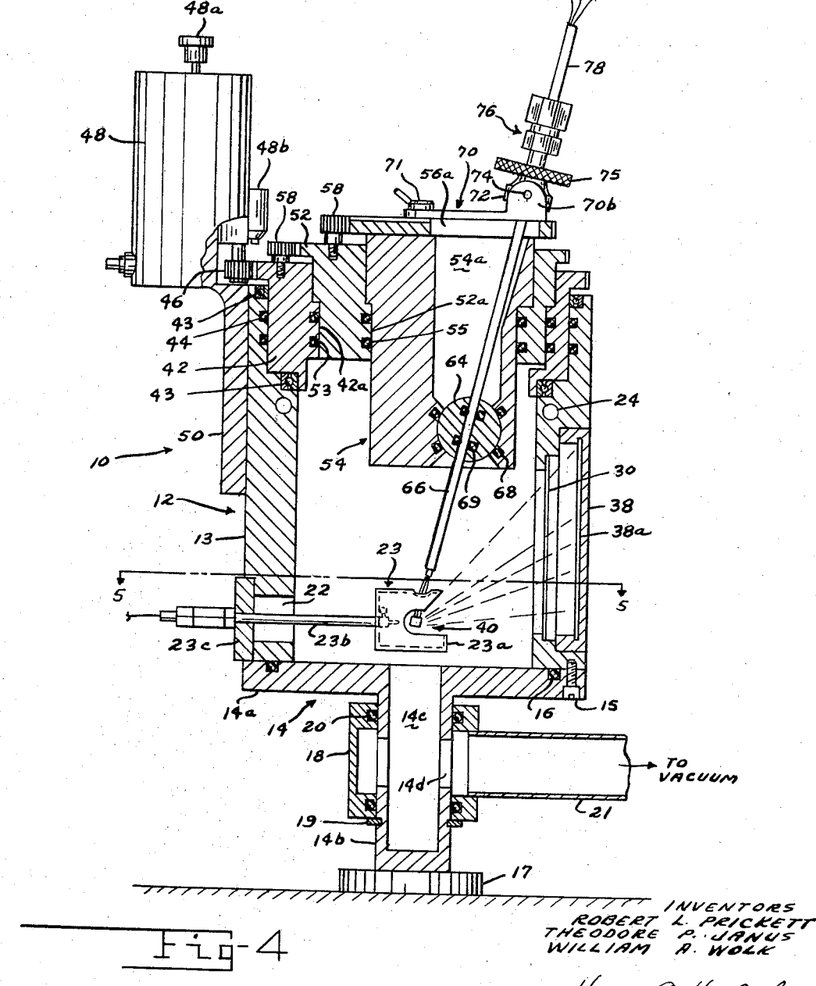
FIG. 4 is a sectional elevation through the camera.

Referring primarily to FIG. 1, FIG. 2 and FIG. 4, the camera which will be referred to as camera 10, has a body member 12 which either contains or supports all the other elements of the camera. If desired, the body member may be machined from a single billet to have a cavity with a circular opening at the top; however, for ease of manufacture it was made from several pieces including an elongated vertical cylinder 13 and a base member 14. The base member is joined to the lower end of the vertical cylinder by means of a plurality of screws 15, as shown on FIG. 4. Leakage is prevented by means of O-ring 16.

Referring specifically to FIG. 4, the base member 14 has a vertical central cylindrical portion 14b terminating at the upper end in a coaxial flange 14a which is joined to and seals the lower end of the vertical cylinder. The lower end of the central cylindrical portion terminates in attaching means, such as mounting ring 17, for removably mounting to the upper face of a horizontal goniometer used for rotating the body member, or for attaching to other apparatus with which the camera is to be used. The mounting ring 17 may be attached by screws (not shown). A downward extending open end bore 14c partially extends through the central cylindrical portion of the base to communicate with the interior of the vertical cylinder 13. The central cylindrical portion 14b further contains one or more lateral bores 14d through the side wall thereof to provide passage means from the outside to the interior of the camera.

Again specifically referring to FIG. 4, the central cylindrical portion 14b of the base member 14 is surrounded by a collector ring 18 which is free to rotate thereon, and which is held in axial position by snap ring 19. Sealing means are provided by O-rings 20. A suitable tube 21, having a threaded flange as shown on FIG. 1, is joined to the collector ring and provides a means for connecting to a vacuum pump used to evacuate the interior of the camera. Since the vacuum source is normally stationary, and since for some operations the camera must be rotated, the collector ring is made to be rotatable in relation with the balance of the camera.

Figure 5:
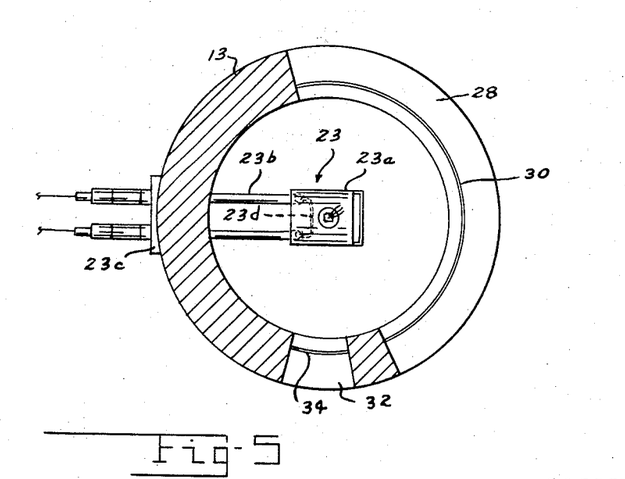
FIG. 5 is a section on line 5—5 of FIG. 4 with the film cassette omitted.

Again referring specifically to FIG. 4, the lower end of vertical cylinder 13 contains an aperture 22 through which heater 23 extends. The heater, as also shown on FIG. 5, has a hollow shell member 23a which is supported by two hollow tubes 23b which pass through aperture 22 where they are joined to a flange 23c. The flange provides the mounting means for removably joining the heater to the camera body with screws (not shown). As best shown on FIG. 5, the heater further contains a filament 23d which is energized from an external power source through suitably insulated electrical connections passing through the hollow tubes 23b. The specific design of the heater itself is not claimed as a portion of this invention. The only requirement for the heater is that it be capable of creating an environmental specimen temperature within the shell on the order of 2500° C. and above.

Cooling means should be provided to dissipate the relatively enormous quantity of heat released within the camera. A plurality of circumferential cooling passages 24 (one of which is shown on FIG. 4) are formed within the wall of the body by the well known method in which a plurality of intersecting holes are tangentially drilled through the wall of the body. All openings are then tapped, and all but two of the tapped openings are plugged with pipe plugs; the remaining two openings being flow entrance and discharge passages. The open tapped holes of each circumferential cooling passage receives a tube fitting such as fitting 25 shown on FIG. 1 and FIG. 3. The several cooling passages are connected by external tubing 26 in a manner to provide series flow through the cooling passages, which are then connected to a flowing source of cooling fluid. If the camera is to be operated at moderate temperature for relatively short time intervals, it may be cooled with conventional external cooling fins.

The elongated vertical cylinder of the body contains two additional apertures through the side wall thereof, each aperture then being sealed with an X-ray transmittable window. The first and larger aperture is best shown on FIG. 2 and FIG. 5 as aperture 28 which is sealed with a relatively thin beryllium window 30. The beryllium window is sealed in position with a high temperature thermal setting epoxy resin. The purpose of the window will be explained hereinafter. A second and smaller aperture 32 is best shown on FIG. 1 and FIG. 5. This aperture is sealed with a relatively thin beryllium window 34 in the same manner the first window is sealed in position. The angular relationship and relative size of the windows in respect to each other and the heater 23 is as shown on FIG. 5. The purpose of window 34 will also be explained hereinafter. The windows 30 and 34 may be made of any suitable material which is readily transmitted by X-rays, and which has suitable characteristics for the temperature and vacuum environment which must be encountered. Beryllium is believed to be the best material; however, other materials such as Mylar or mica may be used. For many test procedures the shape of the windows is not critical; however, it is preferable that at least window 30 be of arcuate form with the geometric center of the arc on the axis of the circular opening in the body member.

For many test procedures for which the camera is adaptable, the test specimen may be aligned within the target area in the camera by means of X-rays. If the windows 30 and 34 are made of optically transparent material, the test specimen may also be aligned through these windows. However, since beryllium, which is the preferred materal is optically opaque, means should be provided for viewing the target area into which the test specimen is to be positioned and oriented. A scope mount 36 is externally joined to the body by means of screws 37 as shown on FIG. 1. The scope mount is in such position and angle that when a monocular scope is inserted into the circular passage of the mount, the line of sight will pass through an optically transparent window 35 in the vertical cylinder 13, as shown only on FIG. 1, and will permit peering at the target area within the camera.

In addition to providing an opening for receiving window 30, that portion of aperture 28 which is external to the window is configured to form a light trap when receiving film cassette 38. The shape of the film cassette should be complementary to the shape of the window; that is, if a plane window is used, the film in the cassette should be held in a plane position. In the embodiment shown, the window 30 is arcuate and the film should likewise be held in a radially arcuate position. The preferred film cassette is arcuate in form, and since it must snugly fit the aperture in the body, it is externally serrated to provide better finger grip surfaces. The film cassette is conventional in form, with an arcuate T-slot 38a as shown on FIG. 4 for receiving and holding a piece of photographic film in arcuate position with the geometric center of the arc on the axis of the circular opening in the body member. This concludes the description of the camera body member and those elements which are directly associated with the body structure.

Those elements of the camera which are used to position and to manipulate the test specimen 40 within the camera, and which are best shown on FIG. 4, will now be described. These elements must have the inherent capacity to move the test specimen in the x, y, and z directions, to tilt the test specimen, and to horizontally rotate the test specimen. Not all of these movements are necessary for all test procedures for which the camera may be used; however, all will be found necessary or useful at one time or another. The x, y, and the rotary movement are produced by three nested circular sleeve members, each of which is rotatable in relation to the camera body and to the other sleeve members.

Referring specifically to FIG. 4, the rotary movement is produced by a first circular sleeve member 42, which has a downward extending hub portion rotatably journaled in an axial counterbore, which will also be referred to as a circular opening, at the upper end of vertical cylinder 13. The circular sleeve member rotates on bearings 43. Suitable O-rings 44 are provided to prevent leakage between the sleeve member and the vertical cylinder. The upper coaxial flange end of the sleeve member, which is above or outside the vertical cylinder, has a gear on the periphery thereof which is engaged by a pinion gear 46 driven by reversible motor-reduction gear 48. The motor-reduction gear is supported in proper alignment by bracket 50 which is joined to the vertical cylinder by screws (not shown). The motor reduction gear used was a Multi-Speed Gearmotor manufactured by the Insco Corporation at Groton, Mass., and was provided with a speed selector 48a at the upper end, and with a reversing switch 48b at the side. It is thus seen that the motor-reduction gear 48 will rotate the first circular sleeve member 42 in either direction in relationship with the camera body.

The first circular sleeve member 42 has an eccentric axial bore 42a therethrough; the bore being eccentric with the hub portion which engages the circular opening in the upper end of vertical cylinder 13. A second circular sleeve member 52, having a downward extending hub portion journaled for rotation in the eccentric bore of the first circular sleeve member, is nested in the first circular sleeve member. O-rings 53 are provided to prevent leakage. The second circular sleeve member 52 terminates at the upper end in a coaxial flange to be above the first circular sleeve member 42; the flange having a gear on the periphery thereof. The second circular sleeve member 52 has an eccentric bore 52a therethrough; the bore being eccentric with the hub portion journaled in the eccentric bore of the first circular sleeve member. A third circular sleeve member 54 has a downward extending hub portion which is rotatably journaled in the eccentric bore in the second circular sleeve member 52. O-rings 55 are provided to prevent leakage. A disk member 56 is coaxially joined to the upper end of the hub portion and positioned to be above the flange on the second circular sleeve member 52. The disk member 56 has a gear on the periphery. The disk member 56 may be made an integral part of the third circular sleeve member and functionally constitutes a portion thereof. The eccentric relationship between the three sleeve members is clearly shown on FIG. 4 on which it will be noted that the wall thicknesses shown on the left side of the drawing are much thicker than the wall thicknesses shown on the right side of the drawing. The eccentric relationship between the sleeve members is also clearly shown on FIG. 3.

Figure 3:
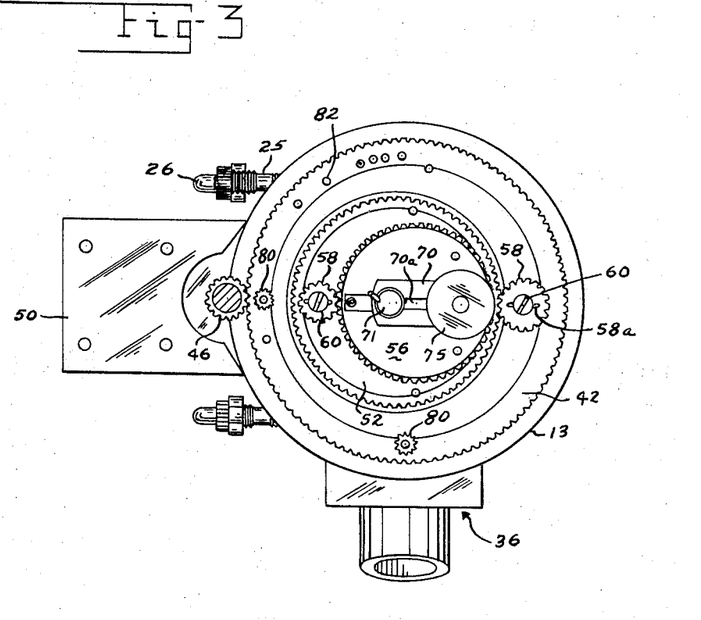
FIG. 3 is a plan view of FIG. 1 with the motor omitted for clarity in showing the gearing.

Again referring to FIG. 4 and also to FIG. 3, the gear on the second sleeve member and the gear on the third sleeve member are each engaged by an adjusting and locking means such as pinion 58. The pinion engaging the gear on the second sleeve member is rotatably supported on the first sleeve member by a conventional shoulder screw 60 as indicated on FIG. 1 and FIG. 3. The pinion engaging the gear on the third sleeve member is rotatably supported on the second sleeve member in like manner. The shouldered shank portion of each shoulder screw 60 on which the adjusting and locking pinion rotates is sufficiently shorter than the overall thickness of the pinion, so that when the screw is firmly tightened, the pinion is locked against rotation. The adjusting and locking pinions are used for adjusting and locking the test specimen 40 in the $x$ and $y$ directions in a manner which will be more fully described hereinafter. For the present it suffices to note that an adjusting means has been provided for adjusting and locking the angular relationship between the first and the second sleeve members, and between the second and third sleeve members. During operation of the camera, both adjusting pinions are locked against rotation and the three sleeve members rotate in the camera body as a unitary structure.

The adjustments of the second and third sleeve members are made with a removable tool 62 which is shown by dotted lines on FIG. 1. This tool consists of an outer sleeve element 62a which has an inside diameter to nest around the head of screw 60 as shown, and a screw driver element 62b which is axially slidable and rotatable in sleeve element 62a, and which further has a screw driver point on the lower end for engaging the slot in screw 60 as shown. The lower end of the sleeve element 62a has a pair of axially extending pins (not shown) which engage slot 58a in the adjusting and locking pinion 58 shown only on FIG. 3. After screw 60 is loosened, the pinion may be rotated the necessary amount, after which the screw is retightened to lock the adjustment.

The third circular sleeve member 54 has an eccentric axial bore 54a which is open at the upper end and terminates at a lower end in a vertically arcuate seat, such as a ball socket, for supporting a tilting member, such as ball 64. The ball has a diametrical bore therethrough which extends into the eccentric axial bore in the third circular sleeve member for receiving an elongated support tube 66. O-rings 68 and 69 are provided to prevent leakage between elements.

Disk member 56, which may be an integral part of the third circular sleeve member, contains an elongated slot 56a for the passage of the upper end of tube 66, as is best shown on FIG. 4. A slidable locking means cooperatively joins the third circular sleeve member 54 and the support tube 66 for releasably holding the support tube in any selected tilting position in relationship with the eccentric bore in the third circular sleeve member, and into any selected axial position in relationship with the cavity within the body of the camera. The slidable locking means has a yoke 70 in superimposed position over the slot 56a in the disk member 56, as shown, As best shown on FIG. 3, the yoke 70 contains an elongated slot 70a which permits sliding the yoke on the shank of holding screw 71 which threadably engages the disk member and is used to lock the yoke in its desired position. Yoke 70 further has a pair of upward extending ears 70b, as best shown on FIG. 2, which are laterally displaced to provide means between which a conventional axially bored split collet 72 may be pivotally supported by pins 74. As shown on FIG. 4, tube 66 extends through ball 64 through the elongated slot in disk member 56, through yoke 70 and through split collet 72. The axial position of tube 66 is maintained by lock nut 75 which threadably engages the split collet and forces the gripping elements of the split collet against the tube in the conventional manner.

The outer end of tube 66 terminates in a conventional compression type tube fitting 76 in which the male element is joined to the end of the tube. In use, insulated thermocouple leads 78 are passed through tube 66. The lower end of the thermocouple leads support the test specimen 40 which is then axially positioned to the desired relationship with tube 66, after which the position is maintained by tightening the nut on the tube fitting. Proper positioning and orientation of the test specimen in the tilt and $z$ positions is accomplished with the locking means engaging the tube. The tilt position is controlled by sliding yoke 70 to the proper position on the disk member, and the $z$ position is controlled by locking the tube into proper axial position which will place the test specimen into the proper heat zone within the cavity.

It should be noted that the first, second and third sleeve members, the ball, the tube, and the thermocouple leads provide a structure in combination which will seal the upper opening of the body member to provide a closed cavity within the body member which may be effectively evacuated by the vacuum source.

Adjustable means are provided for controlling the limits of the oscillations made during the operation of the camera. The adjusting means are best shown on FIG. 1 and FIG. 3. Two limit pins 80 are in threaded engagement with the upper face of the first sleeve member 42 in predetermined angular relationship. The pins are serrated to provide gripping surfaces and have upward extending pins for engaging the reversing switch 48b on motor 48 as shown on FIG. 1. As shown on FIG. 3, a series of tapped holes 82 are provided in the upper face of the first sleeve member 42 for receiving the limit pins 80. The tapped holes are in proper angular position for establishing various predetermined angles of oscillation.

Figure 6:
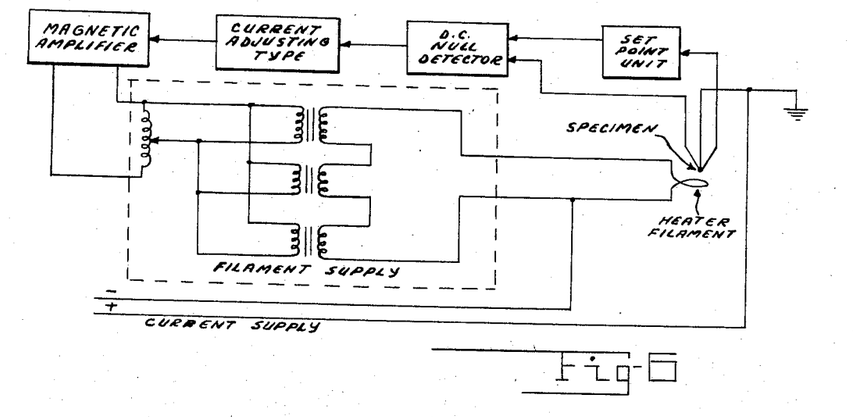
FIG. 6 is a wiring schematic showing the current supply to the heater and the control units for regulating the temperature of the test specimen.

The camera may be connected to any suitable vacuum supply, and the necessary wiring to the motor-reduction gear 48 is obvious. The wiring block diagram for the heater 23 is shown on FIG. 6. The units at the top of the diagram are all standard units manufactured by Leeds and Northrup. The schematic wiring of the filament supply is as indicated.

Figures 7, 8:
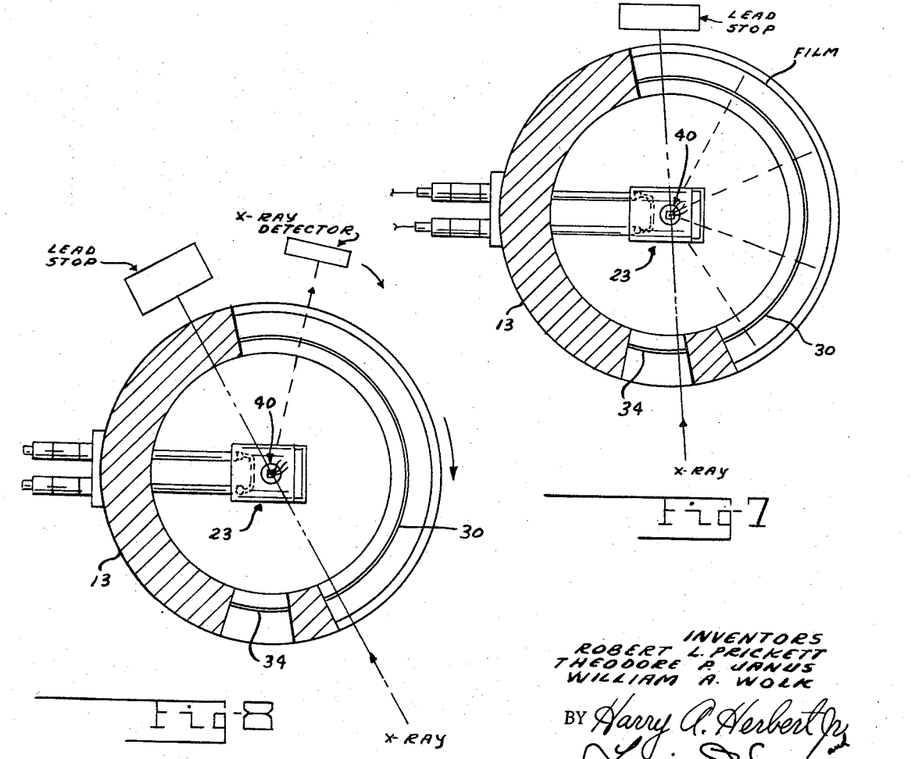
FIG. 7 is a section similar to FIG. 5 and showing the X-ray paths when this invention is performing a camera function.
FIG. 8 is a section similar to FIG. 7 and showing the X-ray paths when this invention is performing a diffractometer function.

The test specimen is brought into proper orientation within the heater by using a conventional monocular scope inserted in the scope mount, thus permitting the test specimen position to be viewed. The X-ray paths when the apparatus is used as a camera are shown on FIG. 4 and FIG. 7. Referring to FIG. 7, an X-ray beam from an external source enters through the small beryllium window 34. The beam impinges the test specimen 40; a portion of the X-rays being diffracted to pass through beryllium window 30 onto a strip film as shown, with the balance of the X-rays passing through the camera and impinging a lead stop as shown. FIG. 7 depicts the horizontal diffraction of the X-rays, and in like manner, FIG. 4 depicts the vertical diffraction.

The use of the camera as a diffractometer is shown on FIG. 8. Film is not used when the camera serves as a diffractometer. The camera is centrally mounted for rotation on a conventional horizontal goniometer; the source of the X-ray beam and the lead stop being stationary. A conventional X-ray detector is externally mounted for rotation about the same axis of rotation about which the camera rotates. The X-ray beam enters the camera through beryllium window 30. The beam impinges the test specimen 40; a portion of the X-rays being diffracted to again pass through the beryllium window and impinge the X-ray detector, with the balance of the X-rays passing through the camera and impinging the lead stop as shown. The direction of rotation for the camera and the X-ray detector are indicated by suitable arrows. Because of Bragg's law, the rate of rotation for the X-ray detector should be two times that of the camera rotation.

The camera constituting this invention has many applications in the field of crystallography in which the test specimen is positioned and oriented in the manner disclosed, but in which elevated temperatures are not required. Unless high temperature work is contemplated, a camera within the scope of this invention will include such apparatus without the heater; or without the heater and the provision for evacuating the camera.

It is to be understood that the embodiment of the present invention as shown and described is to be regarded as illustrative only and that the invention is susceptible to variations, modifications and changes within the scope of the appended claims.

We claim:

1. A crystallography camera adapted for internally supporting and orienting into predetermined adjustable position a test specimen to be impinged by an externally generated X-ray beam and comprising: a vertical cylindrical body member having a cavity with a circular opening at the top and further having a first and a second aperture in the side wall between the periphery of said body member and the cavity therein, said apertures being in circumferentially spaced relationship with each other and axially located in said body member to be adjacent each to the other; a first X-ray transmittable window joined to said body member within the first aperture in said body member; a second X-ray transmittable window joined to said body member within the second aperture in said body member; a film cassette for receiving a piece of photographic film and removably contained within the first aperture in said body member to be radially positioned outside said first window; a first circular sleeve member journaled for rotation within the circular opening of the cavity in said body member and having an eccentric axial bore therethrough; a second circular sleeve member journaled for rotation within the eccentric axial bore in said first circular sleeve member and having an eccentric axial bore therethrough; a third circular sleeve member journaled for rotation within the eccentric axial bore in said second circular sleeve member and having an eccentric axial bore open at the upper end and terminating at the lower end in a vertically arcuate seat; a tilting member movably retained within the vertically arcuate seat in said third circular sleeve member and having an axial bore therethrough extending into the eccentric axial bore in said third circular sleeve member; an elongated support tube slidably retained within the axial bore in said tilting member and having a lower end extending into the cavity in said body member and an upper end extending through said third circular sleeve member, said support tube being adapted for supporting the test specimen within the camera; a first adjusting and locking means joining said first and said second circular sleeve members for adjusting and locking the angular relationship between said first and said second circular sleeve members; a second adjusting and locking means joining said second and said third circular sleeve members for adjusting and locking the angular relationship between said second and said third circular sleeve members; and actuating means joined to said body member and engaging said first circular sleeve member for imparting rotary movement in said body member to the unitary structure comprising said first, second and third circular sleeve members in the locked position; the X-ray beam entering said second window, impinging the test specimen with a portion of the X-rays being diffracted through said first window to impinge the film held in position by said film cassette.

2. A crystallography camera in accordance with claim 1 and further having locking means cooperatively engaging said third circular sleeve member and said support tube for releasably locking said support tube in any selected tilting position in relationship with the eccentric axial bore in said third circular sleeve member.

3. A crystallography camera in accordance with claim 1 and further having locking means cooperatively engaging said third circular sleeve member and said support tube for releasably locking said support tube in any selected tilting position in relationship with the eccentric axial bore in said third circular sleeve member and into any selected axial position in relationship with the cavity in said body member.

4. A high temperature crystallography camera adapted for internally supporting and orienting, into a predetermined adjustable position in a heated vacuum environment, a test specimen to be impinged by an externally generated X-ray beam, said camera comprising: a vertical cylindrical body member having a cavity with a circular opening at the top and passage means adapted for externally connecting to a vacuum source for communication with the cavity in said body member, said body member further having a first and a second aperture in the side wall between the periphery of said body member and the cavity therein, said apertures being in circumferentially spaced relationship with each other and axially located in said body member to be adjacent each to the other; a first arcuate X-ray transmittable window joined to said body member within the first aperture in said body member and with the geometric center of the arcuate surface substantially on the axis of the circular opening at the top of said body member; a second X-ray transmittable window joined to said body member within the second aperture in said body member; a film cassette for receiving and holding a piece of photographic film in arcuate position, said film cassette being removably contained within the first aperture in said body member to be radially positioned outside said first window with the geometric center of the film when in arcuate position substantially on the axis of the circular opening at the top of said body member; a heater having a heat generating element adapted for joining to an external power source having external control, said heater being supported by said body member to place the heat generating element within the cavity of said body member axially positioned to be below the circular opening thereof; a first circular sleeve member having a circular hub portion journaled for rotation in the circular opening at the top of said body member and a coaxial circular flanged end external to the upper end of said body member and with a gear on the periphery, and further having an axial bore therethrough eccentric with the hub portion of said first circular sleeve member engaging the circular opening in said body member; a second circular sleeve member journaled for rotation within the eccentric axial bore in said first circular sleeve member and having an eccentric axial bore therethrough; a third circular sleeve member journaled for rotation within the eccentric axial bore in said second circular sleeve member and having an eccentric axial bore open at the upper end and terminating at the lower end in a vertically arcuate seat; a tilting member movably retained within the vertically arcuate seat in said third circular sleeve member and having an axial bore therethrough extending into the eccentric axial bore in said third circular sleeve member; an elongated support tube slidably retained within the axial bore in said tilting member and having a lower end extending into the cavity in said body member and an upper end terminating in compression means and extending through said third circular sleeve member, said support tube being adapted for receiving and holding in position by the compression means on said support tube a plurality of insulated thermocouple leads for controlling the power source to said heater and for supporting the test specimen within the cavity of said body member; said first, second, and third circular sleeve members, said tilting member, said support tube and the thermocouple leads substantially sealing the circular opening in said body member to provide a closed cavity which may be effectively evacuated through the passage means in said body member; a first adjusting and locking means joining said first and said second circular sleeve members for adjusting and locking the angular relationship between said first and said second circular sleeve members; a second adjusting and locking means joining said second and said third circular sleeve members for adjusting and locking the angular relationship between said second and said third circular sleeve members; and a motor actuating means joined to said body member and having a pinion engaging the gear on said first circular sleeve member for imparting rotary movement in said body member to the unitary structure comprising said first, second, and third sleeve members in the locked position; the X-ray beam entering said second window, impinging the test specimen with a portion of the X-rays being diffracted through said first window to impinge the film held in position by said film cassette.

5. A crystallography camera in accordance with claim 4 and further having locking means cooperatively engaging said third circular sleeve member and said support tube for releasably locking said support tube in any selected tilting position in relationship with the eccentric axial bore in said third circular sleeve member.

6. A crystallography camera in accordance with claim 4 and further having locking means cooperatively engaging said third circular sleeve member and said support tube for releasably locking said support tube in any selected tilting position in relationship with the eccentric axial bore in said third circular sleeve member and into any selected axial position in relationship with the cavity in said body member.

7. A crystallography camera adapted for internally supporting and orienting into predetermined adjustable position a test specimen to be impinged by an externally generated X-ray beam and comprising: a vertical cylindrical body member having a cavity with a circular opening at the top and further having a first and a second aperture in the side wall between the periphery of said body member and the cavity therein, said apertures being in circumferentially spaced relationship with each and axially located in said body member to be adjacent each to the other; a first arcuate X-ray transmittable window joined to said body member within the first aperture in said body member and with the geometric center of the arcuate surface substantially on the axis of the circular opening at the top of said body member; a second X-ray transmittable window joined to said body member within the second aperture in said body member; a film cassette for receiving and holding a piece of photographic film in arcuate position; said film cassette being removably contained with the first aperture in said body member to be radially positioned outside said first window with the geometric center of the film when in arcuate position substantially on the axis of the circular opening at the top of said body member; a first circular sleeve member having a circular hub portion journaled for rotation in the circular opening at the top of said body member and a coaxial circular flanged end external to the upper end of said body member and with a gear on the periphery, and further having an axial bore therethrough eccentric with the hub portion of said first circular sleeve member engaging the circular opening in said body member; a second circular sleeve member having a circular hub portion journaled for rotation in the eccentric axial bore in said first circular sleeve member and a coaxial circular flanged end external to the upper end of said first circular sleeve member and with a gear on the periphery, and further having an axial bore therethrough eccentric with the hub portion of said second circular sleeve member engaging the eccentric axial bore in said first circular sleeve member; a third circular sleeve member having a circular hub portion journaled for rotation in the eccentric axial bore in said second circular sleeve member and a coaxial circular flanged end external to the upper end of said second circular sleeve member and with a gear on the periphery, and further having an eccentric axial bore open at the upper end and terminating at the lower end in a ball socket; a ball member movably retained within the ball socket in said third circular sleeve member and having a diametrical bore therethrough extending into the eccentric axial bore in said third circular sleeve member; an elongated support tube slidably retained within the diametrical bore in said ball member and having a lower end extending into the cavity in said body member and an upper end extending through said third sleeve member, said support tube being adapted for supporting the test specimen within the camera; a first adjusting and locking pinion means rotatably supported on said first circular sleeve member and having a gear engaging the gear on said second circular sleeve member for adjusting and locking the angular relationship between said first and said second circular sleeve members; a second adjusting and locking pinion means rotatably supported on said second circular sleeve member and having a gear engaging the gear on said third circular sleeve member for adjusting and locking the angular relationship between said second and said third circular sleeve members; and a motor actuating means joined to said body member and having a pinion engaging the gear on said first circular sleeve member for imparting rotary movement in said body member to the unitary structure comprising said first, second, and third sleeve members in the locked position; the X-ray beam entering said second window, impinging the test specimen with a portion of the X-rays being diffracted through said first window to impinge the film held in position by said film cassette.

8. A crystallography camera in accordance with claim 7 in which said first and said second windows are of beryllium and further having:
 (a) locking means cooperatively engaging said third circular sleeve member and said support tube for releasably locking said support tube in any selected tilting position in relationship with the eccentric axial bore in said third circular sleeve member, and
 (b) an optically transparent window means in said body member for externally peering at the target area within said body member into which the test specimen is to be oriented.

9. A high temperature crystallography camera for rotation on a horizontal goniometer and adapted for internally supporting and orienting, into predetermined adjustable position in a heated vacuum environment, a test specimen to be impinged by an externally generated X-ray beam, said camera comprising: a body member comprising a vertical cylinder with a circular opening at the top and a base joined to and extending downward from the lower end of the vertical cylinder, said cylinder having a first and a second aperture in the side wall in circumferentially spaced relationship with each other and axially located to be adjacent each to the other, said base having a central cylindrical portion terminating at the upper end in a coaxial flange joined to and sealing the lower end of said vertical cylinder and terminating at the lower end in attaching means for removably mounting on a horizontal goniometer for rotating said body member, said base further having a downward extending open end bore partially extending through the central cylindrical portion to be in communication with the interior of said vertical cylinder and a lateral bore between the periphery of the central cylindrical portion and the downward extending bore in the central cylindrical portion of said base; a collector ring coaxially and rotatably surrounding the central cylindrical portion of said base and having internal passage means communicating with the lateral bore in the central cylindrical portion of said base and adapted for joining in a vacuum source for communication with the interior of the vertical cylinder of said body member; a first arcuate X-ray transmittable window joined to said vertical cylinder within the first aperture in said cylinder and with the geometric center of the arcuate surface substantially on the axis of the circular opening at the top of said vertical cylinder; a second X-ray transmittable window joined to said vertical cylinder within the second aperture in said vertical cylinder; a film cassette for receiving and holding a piece of photographic film in arcuate position; said film cassette being removably contained within the first aperture in said vertical cylinder to be radially positioned outside said first window with the geometric center of the film when in arcuate position substantially on the axis of the circular opening at the top of said vertical cylinder; a heater having a heat generating element adapted for joining to an external power source having external control, said heater being supported by said vertical cylinder to place the heat generating element within said vertical cylinder axially positioned to be proximate to said first and said second windows; a first circular sleeve member having a circular hub portion journaled for rotation in the circular opening at the top of said vertical cylinder and a coaxial circular flanged end external to the upper end of said vertical cylinder and with a gear on the periphery, and further having an axial bore therethrough eccentric with the hub portion of said first circular sleeve member engaging the circular opening at the top of said vertical cylinder; a second circular sleeve member having a circular hub portion journaled for rotation in the eccentric axial bore in said first circular sleeve member and a coaxial circular flanged end external to the upper end of said first circular sleeve member and with a gear on the periphery, and further having an axial bore therethrough eccentric with the hub portion of said second circular sleeve member engaging the eccentric axial bore in said first circular sleeve member; a third circular sleeve member having a circular hub portion journaled for rotation in the eccentric axial bore in said second circular sleeve member and a coaxial circular flanged end external to the upper end of said second circular sleeve member and with a gear on the periphery, and further having an eccentric axial bore open at the upper end and terminating at the lower end in a ball socket; a ball member movably retained within the ball socket in said third circular sleeve member and having a diametrical bore therethrough extending into the eccentric axial bore in said third circular sleeve member; an elongated support tube slidably retained within the diametrical bore in said ball member and having a lower end extending within the cavity in said vertical cylinder and an upper end terminating in compression means and extending through said third circular sleeve member, said support tube being adapted for receiving and holding in position by the compression means on said support tube a plurality of insulated thermocouple leads for controlling the power source to said heater and for supporting the test specimen within said body member; said first, second, and third circular sleeve members, said ball member, said support tube and the thermocouple leads substantially sealing the circular opening at the top of said vertical cylinder to provide a closed cavity which may be effectively evacuated through the passages in said base and said collector ring; a first adjusting and locking pinion means rotatably supported on said first circular sleeve member and having a gear engaging the gear on said second circular sleeve member for adjusting and locking the angular relationship between said first and said second circular sleeve members; a second adjusting and locking pinion means rotatably supported on said second circular sleeve member and having a gear engaging the gear on said third circular sleeve member for adjusting and locking the angular relationship between said second and said third circular sleeve members; and a motor actuating means joined to said body member and having a pinion engaging the gear on said first circular sleeve member for imparting rotary movement in said body member to the unitary structure comprising said first, second, and third sleeve members in the locked position; the X-ray beam entering said second window, impinging the test specimen with a portion of the X-rays being diffracted through said first window to impinge the film held in position by said film cassette.

10. A crystallography camera in accordance with claim 9 in which said first and said second windows are beryllium and further having:
 (a) a plurality of cooling passage means within said body member adapted for joining to a source of cooling fluid,
 (b) locking means cooperatively engaging said third circular sleeve member and said support tube for releasably locking said support tube in any selected tilting position in relationship with the eccentric axial bore in said circular sleeve member, and
 (c) an optically transparent window means in said vertical cylinder for externally peering at the target area within said body member into which the test specimen is to be oriented.

References Cited
UNITED STATES PATENTS

| | | | |
|---|---|---|---|
| 2,514,382 | 7/1950 | Friedman et al. | 250—51.5 |
| 3,005,099 | 10/1961 | Fournier et al. | 250—51.5 |
| 3,113,209 | 12/1963 | Shimula | 250—51.5 |

RALPH G. NILSON, *Primary Examiner.*

WILLIAM F. LINDQUIST, *Examiner.*